United States Patent [19]

Suetaka

[11] Patent Number: 5,097,348
[45] Date of Patent: Mar. 17, 1992

[54] IMAGE DATA RECORDING/REPRODUCING APPARATUS INCLUDING SUPERIMPOSING FUNCTION

[75] Inventor: Hiroyuki Suetaka, Akishima, Japan

[73] Assignee: Casio Computer Co., Ltd., Tokyo, Japan

[21] Appl. No.: 314,446

[22] Filed: Feb. 22, 1989

[30] Foreign Application Priority Data

Feb. 29, 1988 [JP] Japan .................................. 63-46848

[51] Int. Cl.$^5$ .............................................. H04N 5/76
[52] U.S. Cl. ..................................... 358/335; 360/33.1
[58] Field of Search ............... 358/310, 319, 343, 230, 358/335, 311, 183, 147, 22, 22 PIP, 909, 142; 360/19.1, 46, 33.1, 35.1, 37.1

[56] References Cited

U.S. PATENT DOCUMENTS

| | | | |
|---|---|---|---|
| 4,175,267 | 11/1979 | Tachi | 358/147 |
| 4,288,809 | 9/1981 | Yabe | 358/147 |
| 4,419,699 | 7/1990 | Christopher et al. | 358/340 |
| 4,451,846 | 7/1990 | Iyehara et al. | 358/230 |
| 4,839,743 | 7/1990 | Best et al. | 358/335 |
| 4,899,139 | 2/1990 | Ishimochi et al. | 358/183 |
| 4,908,722 | 7/1990 | Sonobe | 360/46 |

Primary Examiner—Roy N. Envall, Jr.
Assistant Examiner—Thai Tran
Attorney, Agent, or Firm—Frishauf, Holtz, Goodman & Woodward

[57] ABSTRACT

In a picture information processing apparatus, when a picture signal is recorded on a magnetic disk apparatus, or the like, a message for this picture signal is input by a key entry unit, and the entered message data are recorded during the vertical flyback period of the picture signal. While the picture signal is read out from the magnetic disk apparatus, the message data which have been recorded during the vertical flyback period of the picture signal are extracted and then stored. Then, the extracted message data is arbitrarily synthesized with the readout picture signal. Thus, the message data is displayed together with the picture signal on the display screen.

12 Claims, 5 Drawing Sheets

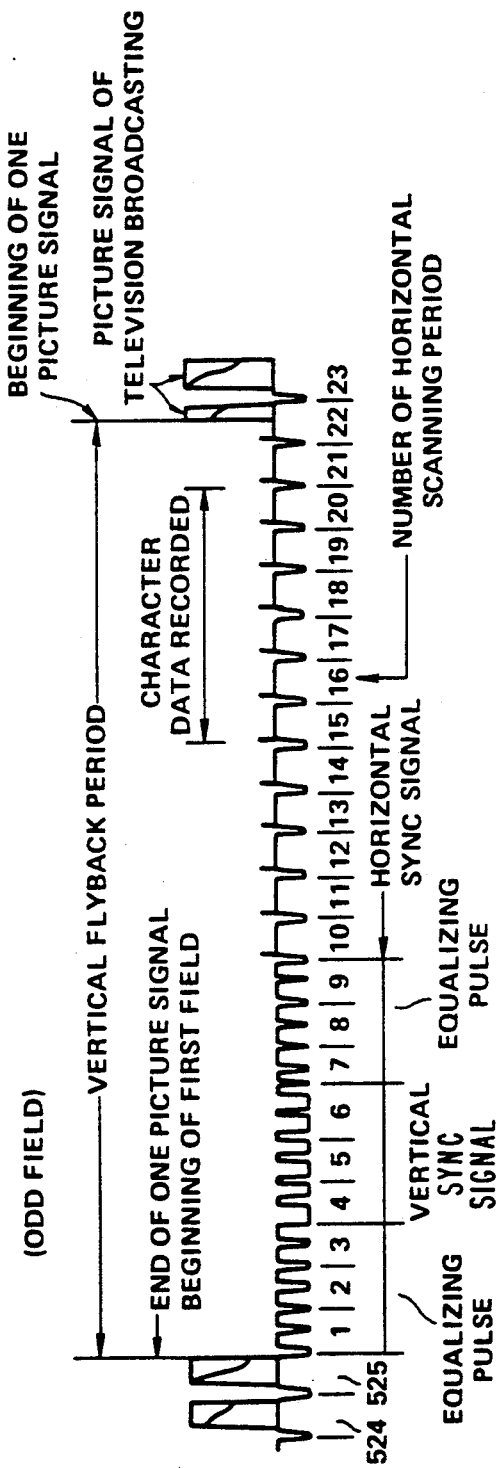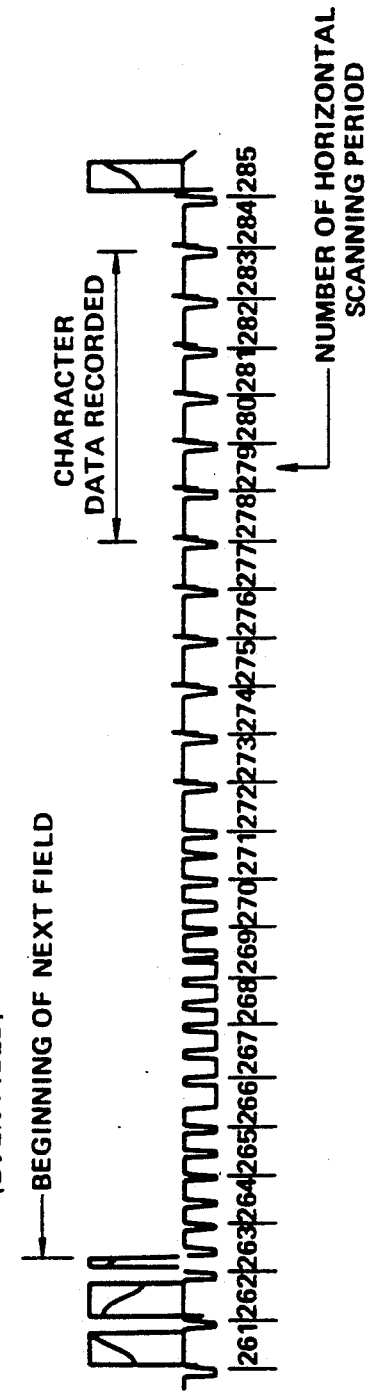

IMAGE DATA RECORDING/REPRODUCING APPARATUS INCLUDING SUPERIMPOSING FUNCTION

BACKGROUND OF THE INVENTION

1. Field of the Invention

The present invention generally relates to an image data recording/reproducing apparatus including a superimposing function. More specifically, the present invention is directed to an image information processing apparatus where both image data and character data, e.g., a title, a comment and the like which are to be superimposed with the image data, are recorded on a recording medium during a recording operation, and the image data is synthesized with the character data in a proper way during a reproducing operation.

2. Description of the Related Art

In general, when image data is recorded on a recording medium such as a floppy disk and a video tape while being superimposed with the messages, e.g., a title, a comment and so on, and reproduced, the message data is superimposed on the image data by employing a superimposing unit during the recording operation on the recording medium.

In such image data recording/reproducing apparatuses, the following problem may exist. That is, since the message data is superimposed on the image data during the recording operation on the recording medium, only the message data cannot be released or deleted from the reproduced picture during the reproducing operation.

Also in the known electronic still camera employing a video floppy disk, a queue track for recording the ID data is additionally provided on the floppy disk having a track for recording the image data. As a result, the message data can be recorded on the floppy disk without being superimposed with the image data in the electronic still camera. However, the storage capacity of a storage device which is capable of storing message data of the queue track is very small, i.e. about 90 bits in respect to each image data recorded on the floppy disk.

As one solution method for the above-described conventional problems, the message data may be independently recorded on the image data recording track (16k bytes) of the floppy disk, and both the image data and message data may be synthesized in a proper way during the reproducing operation. However, this solution may cause other difficulties. That is, very complex supervision and control operations are required for the data recorded on the image data recording track and the recording/reproducing head.

SUMMARY OF THE INVENTION

The present invention has been made in an attempt to solve the conventional drawbacks of the image data recording/reproducing apparatus. An object of the invention is to provide an image information processing apparatus with having a simple construction, in which both the image data and message data are recorded on the recording medium in such a manner that the message data can be reproduced and is synthesized with the reproduced image data.

To achieve the above-described object, a video data processing apparatus according to the invention comprises:

video-picture signal input means for obtaining a video picture signal;

message data input means for inputting message data;

recording means for recording both the video picture signal and the message data on a recording medium;

first vertical-flyback-period detecting means for detecting a vertical flyback period of the video picture signal obtained by said video picture signal input means to produce a first detecting signal; and, recording control means for controlling a recording operation of said recording means in response to the first detecting signal produced by said first vertical-flyback-period detecting means, so as to record the message data on said recording medium during the vertical retracting period.

With the above-described circuit arrangement, the video data processing apparatus according to the invention has the following features. That is, the message data can be recorded in relation to the image data without employing a specific track to record the message data thereon during the recording operation. A selection can be made whether or not the message data is to be displayed together with the image data during the reproducing operation.

BRIEF DESCRIPTION OF THE DRAWINGS

The invention will now be described further by way of example only and with reference to the accompanying drawings, in which:

FIGS. 2A and 2B show waveforms of the vertical flyback period of the standard television signal in which the character data are inserted;

DETAILED DESCRIPTION OF THE PREFERRED EMBODIMENTS

Entire Circuit of Picture Information Processing Apparatus

Figure 1:
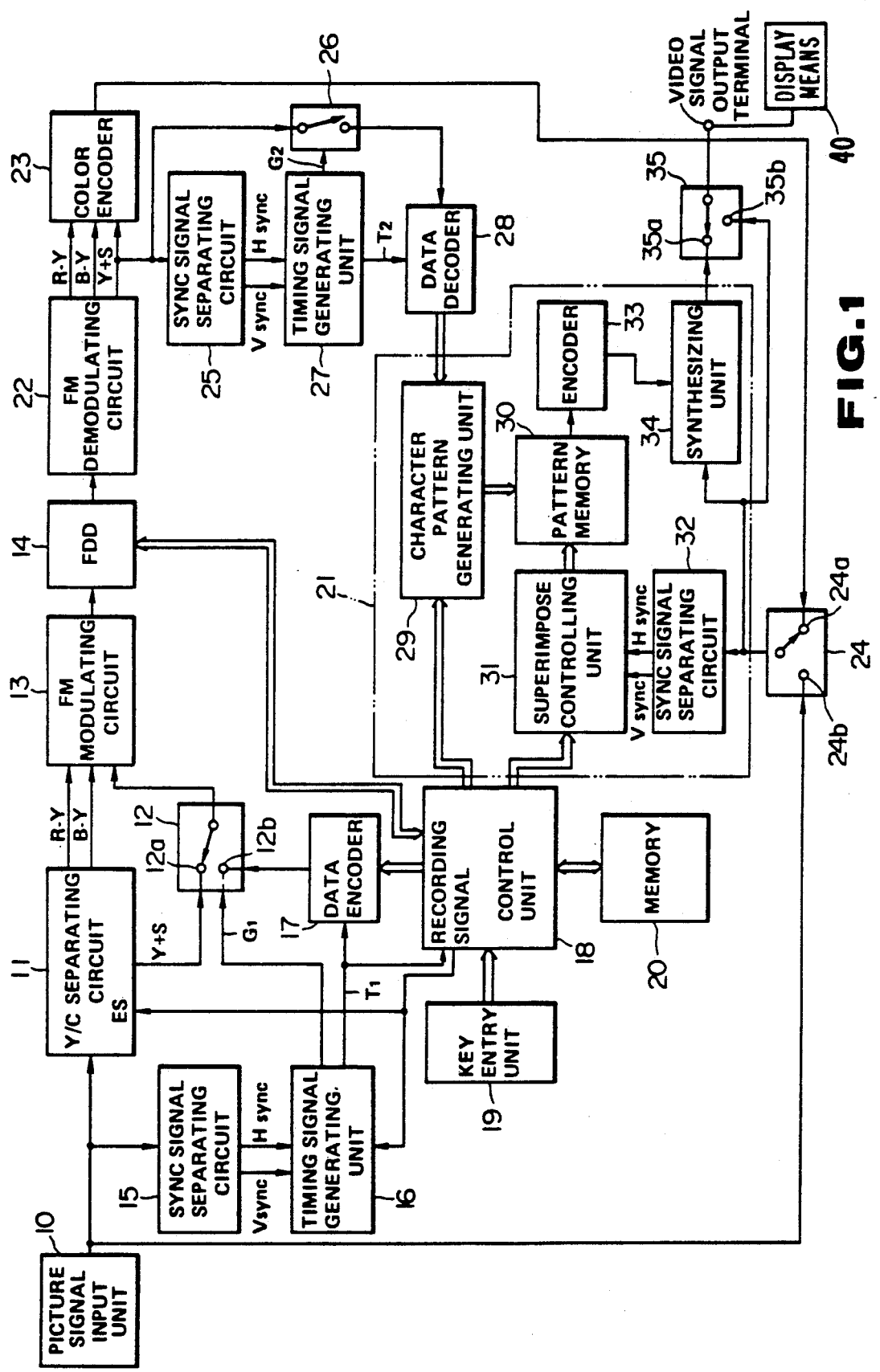
FIG. 1 is a schematic block diagram of a circuit diagram of an image information processing apparatus according to a preferred embodiment of the invention.

In FIG. 1, there is shown an entire circuit of a picture (image) information processing apparatus according to a first preferred embodiment of the invention.

It should be noted that "a video picture signal" mentioned in the present specification implies an image signal capable of being reproduced in a television receiver. In other words, this video picture signal contains at least an image (video) signal and a vertical synchronization flyback period.

It should also be understood that "a video picture signal input means" corresponds to a means for inputting the video picture signal. That is, this video picture signal input means receives the video picture signals derived from various devices, e.g., imaging elements (CCD), television broadcasting waves, video tape recorders.

In the image (picture) information processing circuit shown in FIG. 1, a picture signal input unit 10 is arranged by, for example, a video signal input terminal, a television signal receiving unit, and an imaging unit including an imaging element. An image signal output from the image signal input unit 10 is supplied to a Y/C separating circuit 11. The function of this Y/C separating circuit 11 is to separate the input color picture signal into luminance and sync (synchronization) signals (Y + S), and color-difference signals (R-Y; B−Y). The luminance and sync signal (Y + S) output from the Y/C separating circuit 11 is supplied via a contact 12a of a switch unit 12 to an FM modulating circuit 13, whereas the color-difference signals (R − Y), (B − Y) are directly supplied to this IM modulating circuit 13. The FM modulating circuit 13 frequency-modulates each of signals output from the Y/C separating circuit 11 and switch unit 12, and superimposes these signals with each other. The picture signal which has been modulated and produced by superimposing the (Y + S) signal with the (R − Y; B − Y) signals, is supplied to a magnetic disk apparatus (FDD: floppy disk device) 14 where this picture signal is recorded on a floppy disk (not shown in detail).

The picture signal from the picture signal input unit 10, on the other hand, is also supplied to a sync signal separating circuit 15. The function of the sync signal separating circuit 15 is to extract and separate a vertical sync signal $V_{sync}$ and a horizontal sync signal $H_{sync}$ from the picture signal. Both of these sync signals are supplied to a timing signal generating circuit or unit 16.

The sync signal separating circuit 15 detects outputs of an equalizing pulse and vertical sync pulse, as shown in FIGS. 2A and 2B and outputs as the vertical sync signal $V_{sync}$ a pulse signal having the same duration period as that during which the equalizing pulse and vertical sync pulse are produced.

In response to the input horizontal sync signal $H_{sync}$, the timing signal generating unit 16 detects a predetermined horizontal scanning period 15 to 20H (277 to 283H) within the vertical (synchronization) flyback period of the picture signal input thereto, as illustrated in FIGS. 2A and 2B, and then produces a gate signal "G₁" based upon the above-described predetermined vertical flyback period and also a timing signal "T₁" having a predetermined rate (for instance, 5.73 MHz).

Internal Circuit of Timing Signal Generating Unit

Figure 3:
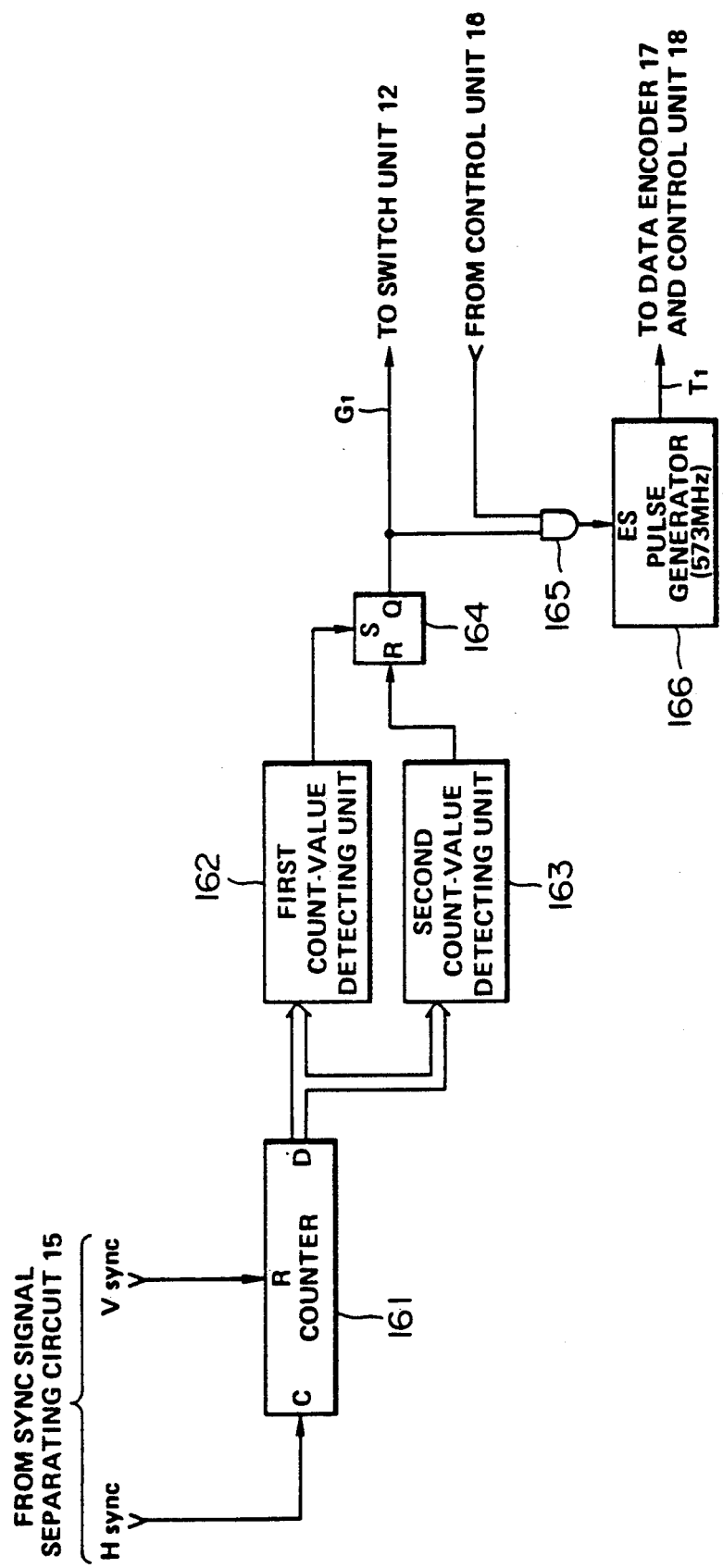
FIG. 3 is a schematic block diagram of an internal circuit of the timing signal generating unit shown in FIG. 1.

Referring now to FIG. 3, an internal circuit arrangement of the above-described timing signal generating unit 16 will be described.

In the internal circuit, both the vertical sync signal $V_{sync}$ and horizontal sync signal $H_{sync}$ supplied from the sync signal separating circuit 15 are supplied to a reset terminal "R" and a clock terminal "C" of a counter 161, respectively. The counter 161 counts up its count value every time the horizontal sync signal $H_{sync}$ is input thereto, whereas it is reset when the vertical sync signal $V_{sync}$ is input.

The count value of the counter 161 is output to a first count-value detecting unit 162 and a second count-value detecting unit 163. The first count-value detecting unit 162 detects that the count value of the counter 161 reaches "6", namely detects a 15th-H (277th-H) horizontal sync signal $H_{sync}$ as illustrated in FIGS. 2A and 2B. The second count-value detecting unit 163 detects that the count value of the counter 161 reaches "12", namely detects a 21st-H (284th-H) horizontal sync signal $H_{sync}$, as shown in FIGS. 2A and 2B.

A coincidence detecting signal from the first count-value detecting unit 162 is supplied to a set terminal "S" of a flip-flop 164. A coincidence detecting signal from the second count-value detecting unit 163 is furnished to a reset terminal "R" of this flip-flop 164.

An output from the flip-flop 164 is supplied as a gate signal "G₁" to the switch unit 12 and also to one terminal of an AND gate 165. To another input terminal of the AND gate 165, a record command signal from the control unit 18 is supplied, and the AND gate 165 supplies an enable signal "ES" to a pulse generator 166 when these input signals satisfy a predetermined condition. The pulse generator 166 outputs a timing signal "T₁" having, for instance, a frequency of 5.73 MHz. Then, the timing signal "T₁ is supplied to a data encoder 17 and also a control unit 18.

It should be noted since the frequency of this timing signal "T₁" is selected to be 5.73 MHz, 1104-bit data can be recorded during 6H of the horizontal scanning period in case of employing a predetermined data format (will be described later).

The gate signal "G₁" output the timing signal generating unit 16 with the above-described circuit arrangement, is supplied as a contact-changing signal (12a into 12b) to the switch unit 12. The timing signal "T₁" is furnished as an encode timing signal to a data encoder 17, and also as a data-transfer timing signal to the control unit 18. To this control unit 18, a key entry unit 19, a memory 20 and a superimposing circuit 21 are connected. The function of the key entry unit 19 is to key-enter character data such as characters and numerals which are superimposed on the reproduced image data. The key-entered character data are sent via the control unit 18 to the memory 20 and once stored therein. Also, the key-entered coordinate data are output via the control unit 18 to the superimposing circuit 21.

The key-entered character data stored into the memory 20 are read out in the control unit 18 only in a predetermined vertical flyback period of the input picture signal, during which both the gate signal "G₁" and timing signal "T₁" are produced from the timing signal generating unit 16. Thereafter, the readout character data are transferred via the data encoder 17 and switch unit 12 to the FM modulating circuit 13. In this case, the character data supplied to the FM modulating circuit 13 are superimposed with and inserted into the picture signal which has been inputted via the Y/C separating circuit 11 during the above-described predetermined vertical flyback period, and thereafter recorded on the floppy disk of the magnetic disk apparatus 14.

Figure 4:
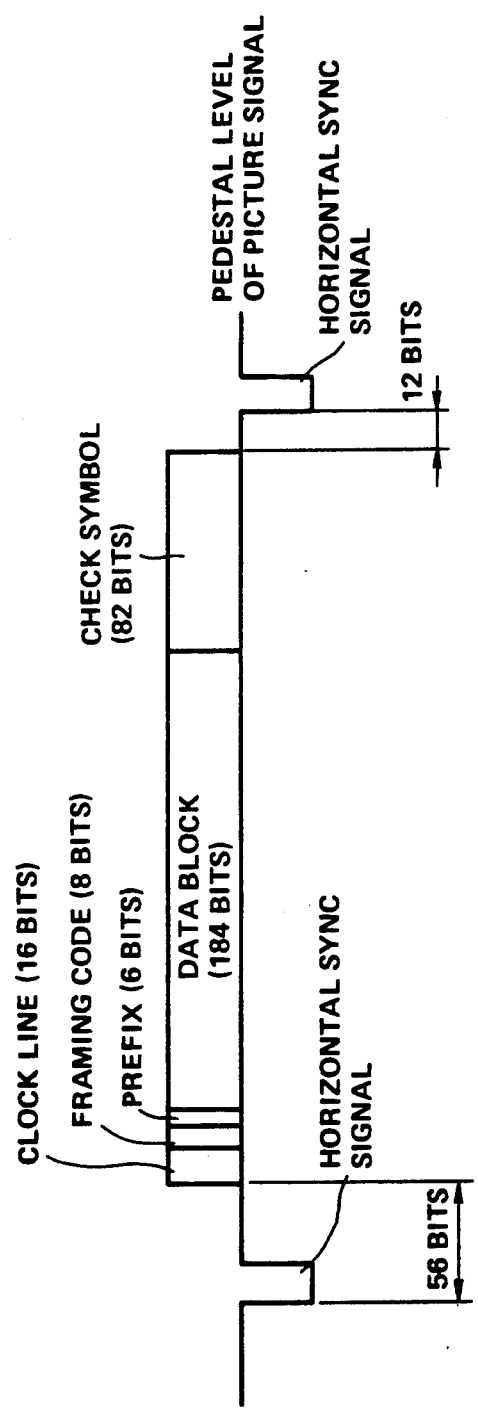
FIG. 4 illustrates a data format used for inserting the character data during the vertical flyback period of the image signal; and, FIG. 5 is a schematic block diagram of an internal circuit of the superimpose controlling unit illustrated in FIG. 1.

The above-described data encoder 17 forms a data format, illustrated in FIG. 4, in response to the data transferred from the control unit 18. That is, according to the data encoder 17, a horizontal synchronization (sync) signal is produced. After 56 bits data from the beginning of the horizontal sync signal, i.e., 9.77 μs (microseconds) have elapsed, a 296-bit data line is produced. Similarly, after 12 bits data from the end of the data line, i.e., 2.09 μs have elapsed, the subsequent horizontal sync signal is produced.

It should be understood that the above-described data line is constructed of a clock line (16 bits) for establishing bit synchronization; a framing code (8 bits) for achieving byte synchronization; a prefix (6 bits) for representing continuity of the data block; a data block (184 bits) and a check code (82 bits). Also, the above-mentioned data line is set in such a manner that "0"-leveled data corresponds to a pedestal level of a picture signal, whereas "1"-leveled data corresponds to 70 percents of a white level of the picture signal.

The picture signals which have been recorded on the floppy disk (not shown in detail) of the magnetic disk apparatus 14, are output to an FM demodulating circuit 22. The FM demodulating circuit 22 demodulates the picture signals read from the magnetic disk apparatus 14 so as to separate the luminance signal ("Y" signal) containing partially the character data, the sync signal (Y+S) and the color difference signals (R−Y), (B−Y) from each other. These demodulated picture signals derived from the FM demodulating circuit 13 are output via a color encoder 23 to a contact 24a of a manual switch unit 24. Also, both the luminance signal partially containing the character data and the sync signal (Y+S) which have been demodulated/separated in the FM demodulating circuit 22, are output to a sync signal separating circuit 25 and a switch unit 26. The functions of this sync signal separating circuit 25 are to derive both the vertical sync signal $V_{sync}$ and the horizontal sync signal $H_{sync}$ from the luminance signal and sync signal (Y+S) which are input thereinto. As a result, both the vertical sync signal $v_{sync}$ and horizontal sync signal $H_{sync}$ separated in the sync signal separating circuit 25 are supplied to a timing signal generating unit 27. The circuit arrangement of this timing signal generating unit 27 is similar to that of the above-described timing signal generating unit 16. The function of the timing signal generating unit 27 is to detect a predetermined horizontal scanning period 15 to 20H (277 to 283H) within the vertical flyback period of the demodulated picture signal, and also to produce a gate signal $G_2$ and a timing signal $T_2$ in accordance with this predetermined vertical flyback period. The gate signal $G_2$ from the timing signal generating unit 27 is supplied as a contact-ON-signal to the switch unit 26, whereas the timing signal $T_2$ is furnished to a data decoder 28 as a decode timing signal.

In other words, this timing signal generating unit 27 turns ON the switch unit 26 only while both the gate signal $G_2$ and timing signal $T_2$ are produced, i.e., only during a predetermined vertical flyback period 15 to 20H (277 to 283H) of the demodulated picture signal. Also, the timing signal generating unit 27 outputs to the data decoder 28 the character data which have been previously inserted and recorded during the above-described vertical flyback period.

The character data, on the other hand, which have been superimposed during the vertical flyback period of the picture signal, are first separated from the demodulated picture signal, and secondly supplied as the character code from the above-described data decoder 28 to a character pattern generating unit 29 of a superimpose circuit 21. The character pattern generating unit 29 generates pattern data in response to the character data output from the data decoder 28, and then the pattern data are transferred to a pattern memory 30 so as to be stored therein. The reading operation and writing operation relating to the pattern memory 30 are under control of a superimpose controlling unit 31.

The superimpose controlling unit 31 has a circuit arrangement for outputting the pattern data stored in the pattern memory 30 to an encoder 33 at the timing corresponding to coordinate data which is supplied from the key entry unit 19 via the control unit 18 into therein, in response to both the vertical sync signal $V_{sync}$ and horizontal sync signal $H_{sync}$ of the demodulated picture signal which is supplied from the sync signal separating circuit 32.

Internal Circuit Arrangement of Superimpose Controlling Circuit

An internal circuit of the above-described superimpose controlling circuit 31 will now be described with reference to FIG. 5.

Figure 5:
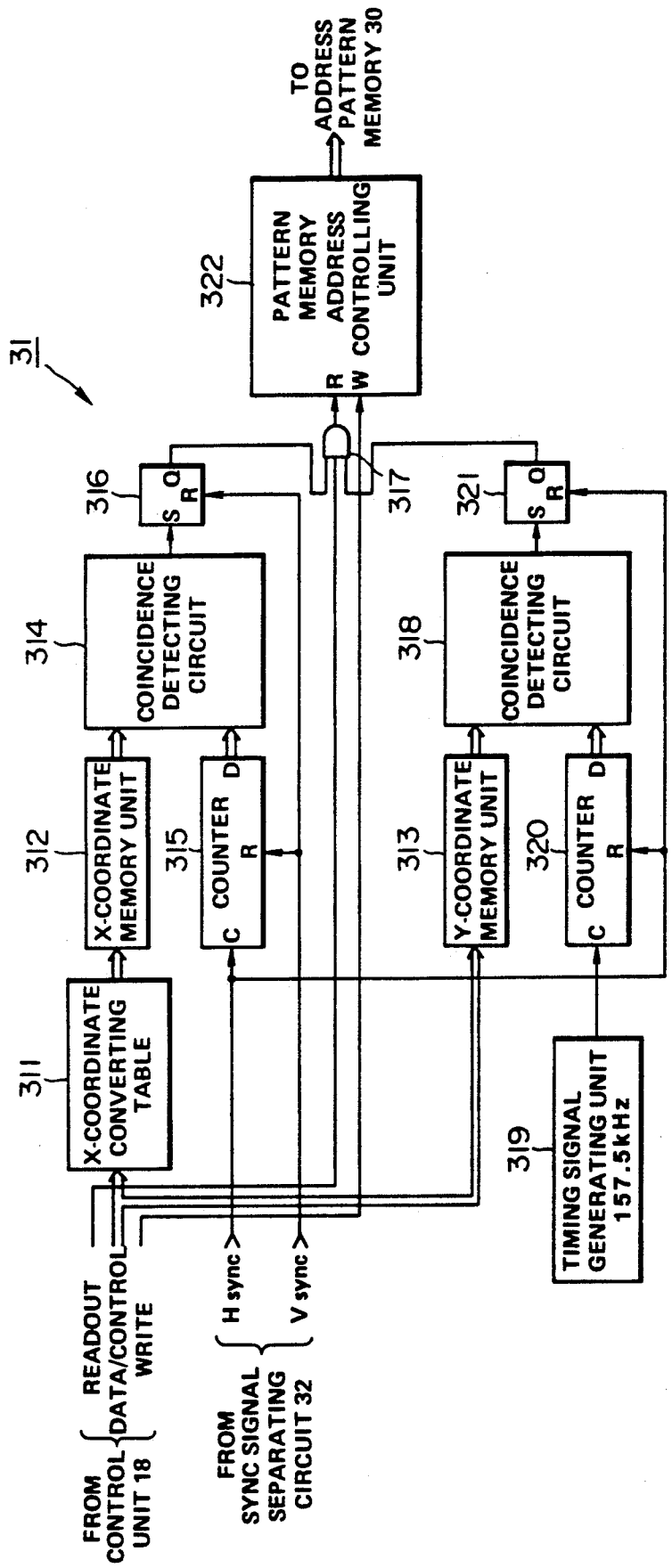

In FIG. 5, coordinate data which have been entered from the key entry unit 19 are supplied via the control unit 18 to an X-coordinate converting table 311.

It should be noted that in the key entry unit 19, the coordinate data are entered based upon the data which are obtained by subdividing the reproduced screen into 10×10 in both the horizontal (X) direction and vertical (Y) direction. If, for instance, the coordinate position is located at the upper left end position, the coordinate data (0;0) is entered. Also, if the coordinate position is located at the bottom right end position, the coordinate data (10;10) is entered.

Referring back to the internal circuit of FIG. 5, the function of the X-coordinate converting table 311 converts the X coordinate data supplied from the control unit 18 into the number of the horizontal scanning line in accordance with the entered coordinate data, and then outputs the converted data to an X-coordinate memory unit 312.

The Y-coordinate data supplied from the control unit 18 is directly supplied to a Y-coordinate memory unit 313 so as to be stored therein.

The X-coordinate data stored in the X-coordinate memory unit 312 is supplied to a coincidence detecting circuit 314. In the coincidence detecting circuit 314, the counting operation is performed by supplying the horizontal sync signal $H_{sync}$ output from the sync signal separating circuit 32 therein, and a judgment is made to the coincidence between the data output from the X-coordinate memory unit 312 and a content of a counter 315 which is reset by the vertical sync signal $V_{sync}$.

When the X-coordinate data supplied from the X-coordinate memory unit 312 is coincident with the counter content of the counter 315, the coincidence detecting circuit 314 outputs the coincidence detecting signal to a set terminal "S" of a flip-flop 316. The flip-flop 316 is reset by the vertical sync signal $V_{sync}$ output from the sync signal separating circuit 32, and supplies its set output to an AND gate 317.

The Y coordinate data stored in the Y coordinate memory unit 313, on the other hand, is supplied to another coincidence detecting circuit 318. In the coincidence detecting circuit 318, a pulse signal having a frequency of 157.5 KHz (which is 10 times higher than the frequency of the horizontal scanning signal, i.e., 15.75 KHz) output from a timing signal generating unit 319 is counted, and a counting content of another counter 320 is supplied which is reset by the horizontal sync signal $H_{sync}$ output from the sync signal separating circuit 32. This coincidence detecting circuit 318 outputs a coincidence detecting signal to a set terminal "S" of flip-flop 321 when detecting a coincidence between the Y-coordinate data of the Y-coordinate memory unit 313 and the counting content of the counter 320. The flip-flop 321 is settable in response to the horizontal sync signal $H_{sync}$ which is output from the sync signal separating circuit 32, and supplies its set output to the AND gate 317.

To this AND gate 317, the signal read out from the control unit 18. An output of the AND gate 317 is read into a pattern memory address controlling circuit 322 as a command signal.

The function of the pattern memory address controlling unit 322 is to control the address of the pattern memory 30 in response to a readout command signal output from the AND gate 317 and a write command signal output from the control unit 18.

With the above-described circuit arrangement, the superimpose control unit 31 can superimpose the character pattern which has been stored in the pattern memory 30, into an area which is located in the right bottom direction with respect to the screen coordinate position. This screen coordinate position is determined as a starting point by the coordinate data input by the key entry unit 19.

On the other hand, the encoder 33 converts the pattern data supplied from the pattern memory 30 into the picture signal and outputs the resultant picture signal to a synthesizing unit 34.

The function of the synthesizing unit 34 is to synthesize the demodulated picture signal which is supplied from the color encoder 23 via the manual switch unit 24, with the picture signal of the character data supplied from the encoder 33. The resultant synthesized picture signal from the synthesizing unit 34 is output from a video signal output terminal via the contact 35a of the manual switch unit 35, and then reproduced on a display means 40 such as a monitor television, or the like. In this case, the character data are superimposed at the display position within the display screen of the display means 40 which is determined by the coordinate data entered by the key entry unit 19, under the control of the data output the control of the data output by the superimpose control unit 31 for the synthesizing unit 34. In other words, the character data are superimposed with the demodulated picture signal so that these character data are viewed together with the reproduced image on the display screen. When the manual switch unit 35 is changed over the contact 35b, the reproduced image signal which is supplied from the color encoder 23 via the manual switch unit 24 is directly output from the video signal output terminal, and then reproduced by the monitor television or the like. As a consequence, in this case, no character data are superimposed with the demodulated picture signal, so that no message is displayed on the display screen.

To the contrary, when the manual switch unit 24 is changed over the contact 24b, the input picture signal is directly supplied to the synthesizing unit 34, and output via the manual switch unit 35 to the video signal output terminal. In this case, the key-entered character data are transferred from the control unit 18 to the character pattern generating unit 29 of the superimpose circuit 21. Similarly, when the manual switch 35 is changed over the contact 35a, the key-entered character data are synthesized with the picture signal in the synthesizing unit 34.

Recording Operation of Image Information Processing Apparatus

Referring back to the circuit diagram of FIG. 1, a recording operation of the image information processing apparatus will now be described.

When a message to be superimposed on image (picture) data is present while the image data entered by the picture signal input unit 10 is recorded, this message is entered by the key entry unit 19. The character data which has been entered as this message by the key entry unit 19 is stored via the control unit 18 into the memory 20.

In response to the recording command entered by the key entry unit 19, the recording signal from the control unit 18 is supplied to the timing signal generating unit 16 and the Y/C separating circuit 11. At the same time, the control operation is commenced between the control unit 18 and magnetic disk apparatus 14 so as to start the recording operation.

The picture (image) signal entered by the picture signal input unit 10 is supplied to the Y/C separating circuit 11 and sync signal separating circuit 15. The sync signal separating circuit 15 detects the equalizing pulse and vertical equalizing pulse as illustrated in FIG. 2A, and then outputs the vertical sync signal $v_{sync}$. Since the counter 161 employed in the timing signal generating unit 16 has been reset by this vertical sync signal $V_{sync}$, the gate signal G supplied from the timing signal generating unit 16 to the switch unit 12 corresponds to a "0" level so that the switch unit 12 is kept to the condition that it is energized to the contract 12a side.

As a result, the luminance signal and sync signal (Y+S) which have been produced by separating the picture signal in the Y/C separating circuit 11, are supplied via the switch unit 12 to the FM modulating circuit 13 together with the color difference signals (R−Y), (B−Y) which have been obtained in the similar manner. These signals are modulated and superimposed with each other in the FM modulating circuit 13. Thereafter, the resultant modulated signal is supplied to the magnetic disk apparatus 14 and recorded on the floppy disk.

Then, when the count value of the counter 161 employed in the timing signal generating unit 16 is equal to 6, the first count-value detecting unit 162 (see FIG. 3) detects this count value and then supplies the detection signal to the set terminal "S" of the flip-flop 164. This counter 161 counts the horizontal sync signal $H_{sync}$ derived from the sync signal separating circuit 15. Since the flip-flop 164 is brought into the set condition, the switch unit 12 is changed over the contact 12b side, and also the pulse generator 166 furnishes the timing signal $T_1$ to the data decoder 17 and control unit 18.

Under the condition, the character data stored in the memory 20 are sequentially read out and supplied to the data encoder 17 under the control of the control unit 18 in synchronism with the timing signal $T_1$ supplied from the pulse generator 166.

The data encoder 17 encodes the character data supplied from the control unit 18 to obtain the above-described format, and thereafter supplies the encoded character data via the switch unit 12 to the FM modulating circuit 13.

On the other hand, in the FM modulating circuit 13, the character data supplied from the data encoder 17 are FM-modulated and then supplied to the magnetic disk apparatus 14.

It should be understood that since the period during which the character data are supplied from the data encoder 17 to the FM modulating circuit 13, corresponds to the vertical flyback period of the picture signal input by the picture signal input unit 10, the color difference signal (R−Y), (B−Y) are not yet input into the FM modulating circuit 13. Accordingly, only the data output from the data encoder 17 are essentially FM-modulated in the FM modulating circuit 13 and the resultant FM-modulated signals are supplied to the magnetic disk apparatus.

The above-described signal processing operation is continued until the count value of the counter 161 employed in the timing signal generating unit 16 is equal to "12". When the count value of the counter 161 becomes "12", the second count-value detecting unit 163 detects its value, and the flip-flop 164 is reset in response to the detecting signal. Upon reset of the flip-flop 164, the switch unit 12 is changed over the contact 12a side. Then, the pulse generator 166 stops the supply of the timing signal $T_2$ to the data encoder 17 and control unit 18.

As a result, since only the luminance signal and sync signal (Y+S) and also color difference signals (R−Y), (B−Y) separated from the picture signal by the Y/C separating circuit 11 are supplied to the FM modulating circuit 13, the FM-modulated and superimposed picture signal output from the FM modulating circuit 13 are recorded on the floppy disk.

In accordance with the picture image information processing apparatus of the invention, the picture signal input from the picture signal input unit 10 and also the character data can be recorded on the floppy disk. The character data are obtained by the key entry unit 19 during the vertical flyback period of the picture signal.

Reproducing Operation of Picture Signal and Character Data

A reproducing operation of the picture signal and character data which have been recorded on the floppy disk will now be described.

First, the picture signal read out from the floppy disk of the magnetic disk apparatus 14 is demodulated in the FM demodulating circuit 22 so as to separate the picture signal into the color difference signals (R−Y), (B−Y), and the luminance signal and sync signal (Y+S). It should be noted that the character data read out from the floppy disk are demodulated together with the luminance and sync signals (Y+S).

Thereafter, both the luminance and sync signals (Y+S), and also the color difference signals (R−Y), (B−Y) are supplied to the color encoder 23, and then output as the color picture signals to the contact 24a of the manual switch unit 24.

Thus, the above-described luminance and sync signals (Y+S) are supplied to the sync signal separating circuit 25 and switch unit 26. The vertical sync signal $V_{sync}$ and horizontal sync signal $H_{sync}$ are derived from the luminance and sync signals (Y+S) by the sync signal separating circuit 25, and then are supplied to the timing signal generating unit 27.

The timing signal generating unit 27 functions as the same as the timing signal generating unit 16. That is, based upon the vertical sync signal $V_{sync}$ and horizontal sync signal $H_{sync}$ output from the sync signal separating circuit 25, the horizontal scanning period 15H (277H) of the picture signal output from the magnetic disk apparatus 14 is detected, and the gate signal $G_2$ is supplied as the ON signal to the switch unit 26, and the timing signal $T_2$ is supplied to the data decoder 28.

At this instant, the luminance and sync signals (Y+S) output from the FM demodulating circuit 22 correspond to the character data inserted into the picture signal, and the character data are supplied via the switch unit 26 to the data decoder 28.

In response to the clock pulse $T_2$ supplied from the timing signal generating unit 27, this data decoder 28 decodes the character data supplied from the FM demodulating circuit 22 and the decoded character data are further supplied to the character pattern generating unit 29.

The character pattern generating unit 29, on the other hand, generates the character pattern based upon the character data supplied from the data decoder 28, and supplies the generated character pattern to the pattern memory 30.

When the horizontal scanning period 21H(284H) of the demodulated picture signal is detected in the timing signal generating unit 27, the gate signal $G_2$ becomes "0" level and the switch unit 26 is brought into the OFF condition, and the supply of the timing signal $T_2$ to the data decoder 28 is stopped.

Then, when the magnetic disk apparatus 14 outputs to the control unit 18 the control signal indicating that 1-field picture signal has been read out from the floppy disk, the control unit 18 outputs the readout signal to the superimpose controlling unit 31.

In response to the vertical sync signal $V_{sync}$ and horizontal sync signal $H_{sync}$ of the demodulated picture signal supplied from the sync signal separating circuit 32, the superimpose controlling unit 31 supplies the content of the pattern memory 30 via the encoder 33 to the synthesizing unit 34 at the timing corresponding to the coordinate data entered by the key entry unit 19.

While the picture signal repeatedly output from the magnetic disk apparatus 14 is supplied via the manual switch unit 24 to the synthesizing unit 34, the above-described character data are synthesized with the color picture signal in this synthesizing unit 34, and the synthesized signal is supplied to the contact 35a of the manual switch unit 35.

On the other hand, another color picture signal which is not supplied via the synthesizing unit 34 is directly supplied from the manual switch unit 24 to the contact 35b of the above-described manual switch unit 35. Accordingly, when the manual switch unit 35 is changed over to the contact 35a side, the color picture signal with superimposing the character data is supplied to the video signal output terminal. Conversely, when the manual switch unit 35 is changed over to the contact 35b, another color picture signal in which the character data are not synthesized is supplied to the video signal output terminal.

Under the conditions that the manual switch unit 24 is changed over to the contact 24b, and the input picture signal is directly output via the synthesizing unit 34 and reproduced, the character data which have been key-entered are supplied from the control unit 18 to the character pattern generating unit 29 of the superimpose circuit 21, and then written into the pattern memory 30. Also in this case, the output of the character pattern is controlled at the display screen position corresponding to the coordinate data entered by the key entry unit 19 under the control of the superimpose controlling unit 31, and the character pattern is synthesized with the input picture signal in the synthesizing unit 34. In this case, the synthesizing operation of the character data is selectively performed by switching the manual switch 35.

As a consequence, according to the image information processing apparatus of the invention, there are no such problems that the memory capacity of the disk track of the floppy disk for the character data is not sufficient, and that the magnetic head drive control becomes complex. Accordingly, the character data are properly synthesized with the picture signal and properly reproduced.

Although the above-described embodiment employed a magnetic disk apparatus using a floppy disk, the present invention is not limited thereto. A magnetic recording/reproducing apparatus employing a video tape may be, for instance, utilized as the above-described magnetic disk apparatus and the substantially the same circuit arrangement may be constructed so as to achieve the major object of the present invention.

What is claimed is:

1. A video data processing apparatus, comprising:
   video-picture signal input means for obtaining a video picture signal;
   message data input means for inputting message data;
   recording means coupled to both said video-picture signal input means and said message data input means for recording both said video picture signal and said message data on a recording medium;
   first vertical-flyback-period detecting means for detecting a vertical-flyback-period of said video picture signal obtained by said video-picture signal input means and for producing a first detecting signal;
   recording control means for controlling a recording operation of said recording means in response to the first detecting signal produced by said first vertical-flyback-period detecting means, so as to record the message data on said recording medium during the vertical flyback period;
   reproducing means for reproducing the video picture signal the message data recorded on said recording medium;
   display means for displaying image information based on the video picture signal and the message data;
   extracting means for extracting message data from the video picture signal and the message data reproduced by said reproducing means;
   storing means for storing the message data extracted from the video picture signal by said extracting means;
   coordinate-data input means for inputting coordinate data indicative of a position on said display means;
   supplying means for supplying the video picture signal reproduced by said reproducing means to said display means;
   output means coupled to both said storing means and said coordinate-data input means for outputting the message data from said storage means synchronized with the supplying of the video picture signal and coordinated to be displayed on said display means at the position indicated by the coordinate data input from said coordinate-data input means; and
   synchronizing means for selectively synthesizing the message data output from said storing means by said output means into the video picture signal reproduced by said reproducing means;
   wherein said display means displays the synthesized message data and video picture signal.

2. A video data processing apparatus as claimed in claim 1, further comprising:
   designating means for designating whether or not the message data output from said storing means by said output means is synthesized into the video picture signal reproduced by said reproducing means by said synthesizing means.

3. A video data processing apparatus as claimed in claim 1, wherein said video-picture signal input means includes television broadcasting wave recording means for receiving a television broadcasting wave.

4. A video data processing apparatus as claimed in claim 1, wherein said video-picture signal input means comprises an imaging unit which includes an imaging element.

5. A video data processing apparatus as claimed in claim 1, wherein said recording means includes a magnetic recording head and means for recording the video-picture signal and the message data on a magnetic recording medium.

6. A video data processing apparatus as claimed in claim 5, wherein said recording means includes means recording the video-picture signal and the message data on a floppy disk.

7. A video data processing means as claimed in claim 1, wherein said first vertical-flyback-period detecting means includes:
   sync signal detecting means for detecting a vertical sync signal and a horizontal sync signal of a video picture signal obtained by said video-picture signal input means; and
   counting means for counting a number of the horizontal sync signals detected by said sync signal detecting means after said sync signal detecting means detects the vertical sync signal, whereby said first vertical-flyback-period detecting means detects a predetermined period of said vertical flyback period.

8. A video data processing apparatus as claimed in claim 7, wherein said recording control means includes inserting means for inserting the message data into the video picture signal when a count value of said counting means becomes a predetermined number.

9. A video data processing apparatus as claimed in claim 1, wherein said message data input means includes:
   key input means for inputting character data; and
   temporary storage means for temporarily storing the character data entered from said key input means.

10. A video data processing means as claimed in claim 9, wherein said first vertical-flyback-period detecting means includes:
    sync signal detecting means for detecting a vertical sync signal and a horizontal sync signal of the video picture signal obtained by said video-picture signal input means; and
    counting means for counting a number of the horizontal sync signal detected by said sync signal detecting means after said sync signal detecting means detects the vertical sync signal; and wherein said recording control means includes inserting means for inserting the character data stored in said temporary storage means into the video picture signal when a count value of said counting means becomes a predetermined number.

11. A video data processing apparatus as claimed in claim 1, wherein said output means includes:
    coordinate-part detecting means for detecting a part of the video picture signal according to the coordinate data input from said coordinate data input means; and
    transfer means for transferring the message data from said storing means to said synthesizing means, when said coordinate-part detecting means detects the part of video picture signal according to the coordinate data input from said coordinate data input means.

12. A video data processing apparatus as claimed in claim 1, wherein said extracting means includes:
   second vertical-flyback-period detecting means for detecting a vertical flyback period of the video picture signal reproduced by said reproducing means; and
   dividing means for dividing the message data from the video picture signal reproduced by said reproducing means when said second vertical-flyback-period detecting means detects the vertical flyback period of the video picture signal reproduced by said reproducing means.

* * * * *